(12) United States Patent
Tizac et al.

(10) Patent No.: US 9,346,540 B2
(45) Date of Patent: May 24, 2016

(54) COUPLING DEVICE OF A MOTORIZED WHEEL OF AIRCRAFT LANDING GEAR

(71) Applicant: AIRBUS OPERATIONS S.A.S., Toulouse (FR)

(72) Inventors: Laurent Tizac, Tournefeuille (FR); Cedric Lesage, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 0 days.

(21) Appl. No.: 14/444,056

(22) Filed: Jul. 28, 2014

(65) Prior Publication Data

US 2015/0034761 A1 Feb. 5, 2015

(30) Foreign Application Priority Data

Jul. 31, 2013 (FR) ...................................... 13 57609

(51) Int. Cl.
*B64C 25/50* (2006.01)
*B64C 25/40* (2006.01)

(52) U.S. Cl.
CPC .................................... *B64C 25/405* (2013.01)

(58) Field of Classification Search
CPC ................................................. B64C 25/405
USPC .......... 244/50, 100 R, 103 R, 104 R, 104 LS; 464/82, 83, 84; 474/94, 902, 903
See application file for complete search history.

(56) References Cited

U.S. PATENT DOCUMENTS

| 5,219,314 A * | 6/1993 | Her ......................... H02K 7/083 464/84 |
| 2010/0288873 A1 | 11/2010 | Cox et al. |
| 2013/0233969 A1* | 9/2013 | Charles ................... B64C 25/36 244/103 R |

FOREIGN PATENT DOCUMENTS

| EP | 2527249 A1 | 11/2012 |
| FR | 2954752 | 7/2011 |
| WO | 2014023939 | 2/2014 |

OTHER PUBLICATIONS

French Patent Office, French Search Report for French Patent Application 1357609 mailed Apr. 17, 2014.

\* cited by examiner

*Primary Examiner* — Christopher P Ellis
*Assistant Examiner* — Richard G Davis
(74) *Attorney, Agent, or Firm* — Ingrassia Fisher & Lorenz, P.C.

(57) ABSTRACT

An elastic device for coupling between an aircraft landing gear wheel and a coaxial motorization member for motorization of the wheel. The elastic device comprises a plurality of arms to be rotationally coupled to the motorization member adjacent a first radially inner end and which are to be linked to the wheel adjacent their radially outer opposite end, the arms being substantially rigid in a plane perpendicular to the rotational axis of the wheel and flexible in directions substantially transverse to the plane.

19 Claims, 4 Drawing Sheets

COUPLING DEVICE OF A MOTORIZED WHEEL OF AIRCRAFT LANDING GEAR

CROSS-REFERENCE TO RELATED APPLICATION

This application claims priority to French Patent Application No. 13 57609 filed Jul. 31, 2013, which is incorporated herein by reference in its entirety.

TECHNICAL FIELD

The technical field concerns an elastic device for coupling between an aircraft landing gear wheel and a coaxial motorization member for motorization of said wheel, as well as to a landing gear equipped with a wheel motorization device and such a coupling device.

BACKGROUND

For reasons of fuel economy, noise reduction, limitation of operating duration and thus wear of the aircraft engines (e.g. jet engines, turboprop engines) etc., it has been proposed to motorize the wheels of their landing gears in order to enable them to move autonomously on hub airports.

It is known to produce this motorization of a landing gear wheel by means of a motorization device comprising a motor, for example an electric motor, a reducing device and a rotational coupling device between the output of the reducing device and the wheel rim.

Furthermore, when an aircraft is in locomotion on the ground, the axles and the wheels of the landing gears undergo high deformations due to the weight of the aircraft transmitted to the axles by the legs of the landing gears.

It is thus necessary for the device for coupling between the wheel, which deforms but which also follows the deformations of the axle, and the motor/reducing device assembly, which is joined to the landing gear, to be capable of absorbing these deformations.

To attempt to solve this problem, a device is known from document FR 0959586 in which a drive ring for driving the motor/reducing device assembly is linked to the wheel rim by metal springs which enable deformations or movements of the rim relative to the ring to be absorbed.

However, such a device does not enable optimal transmission of the torque between the drive ring and the wheel.

In addition, other objects, desirable features and characteristics will become apparent from the subsequent summary and detailed description, and the appended claims, taken in conjunction with the accompanying drawings and this background.

SUMMARY

The teachings of the present disclosure provides a device for coupling between an aircraft landing gear wheel and a coaxial motorization member for motorization of said wheel, which makes it possible to provide optimal transmission of torque between said motorization member and the wheel despite deformations of the axle bearing that wheel, and which substantially does not affect the complexity and duration of the operations for mounting and demounting of the wheel.

To that end, the present disclosure relates to an elastic device for coupling between an aircraft landing gear wheel and a coaxial motorization member for motorization of said wheel, said device comprising a plurality of arms rotationally coupled with said motorization member adjacent a first radially inner end and which are adapted to be linked to said wheel adjacent their radially outer opposite end, said arms being substantially rigid in a plane perpendicular to the rotational axis of the wheel and flexible in directions substantially transverse to said plane.

The device according to the present disclosure, by means of a lightweight structure which is not significantly detrimental to the weight of the aircraft, makes it possible to provide very good transmission of the torque between the motorization member and the wheel while enabling displacements thereof due to the deformations of the axle on which it is mounted.

According to an embodiment of the present disclosure, said arms are joined to a hub adapted to be fastened to said rotary motorization member. The coupling device thus takes the form of a star-shaped part which is easy to optimize with regard to weight and to rotationally couple with the motorization member, for example a toothed wheel.

According to an embodiment of the present disclosure, said arms are adapted to be received, at their radially outer end, bearing in respective housings of a rim of said wheel. This very simple manner of linking participates in limiting the weight caused by the motorization of the wheel and in facilitating the mounting and demounting thereof.

According to an embodiment of the present disclosure, said housings are substantially the shape of a channel of U-section open at one of its ends and said arms have at said radially outer end an elongate knob adapted to be received in one of said housings. This feature makes it possible to facilitate the maintenance in engagement of the arms with the rim despite a relative axial offset of the end of an arm and of the corresponding housing in the rim due to deformations of the axle.

According to an embodiment of the present disclosure, said arms are dimensioned such that, in the mounted position of said wheel on said landing gear, they are axially biased. This feature combined with the previous one makes it possible to limit the axial displacements of the knobs in the housings, and thus to optimize the length of these latter.

According to an embodiment of the present disclosure, the length of said housings is adapted to ensure said knobs are retained independently of the camber angle of said wheel. This feature ensures that all the arms participate in the transmission of the torque, independently of the deformations of the axle.

According to an embodiment of the present disclosure, said housings are provided in a ring joined to said rim. Conventional wheels to which a ring has been fastened by welding or other method may thus be used with a motorization device.

According to an embodiment of the present disclosure, said housings and said knobs are removable parts subject to wear. These parts subject to wear may thus be replaced for a limited cost.

According to an embodiment of the present disclosure, said arms are in the form of strips. A strip is a structure which provides simplicity and lightness of weight to enable the transmission of the torque despite deformations of the axle.

According to an embodiment of the present disclosure, said strips are of smaller cross-section adjacent their radially outer end than adjacent their radially inner end. It is thus possible to easily provide desired characteristics of flexibility to the strips according to their width and/or their thickness.

The various teachings of the present disclosure also relate to an aircraft landing gear comprising at least one wheel, a device for motorization of said wheel comprising said motorization member, and a coupling device as defined above. Such a landing gear makes it possible to substantially limit the increase in weight linked to the motorization of one or more wheels.

Lastly, the present disclosure also relates to an aircraft comprising at least one landing gear as defined above.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
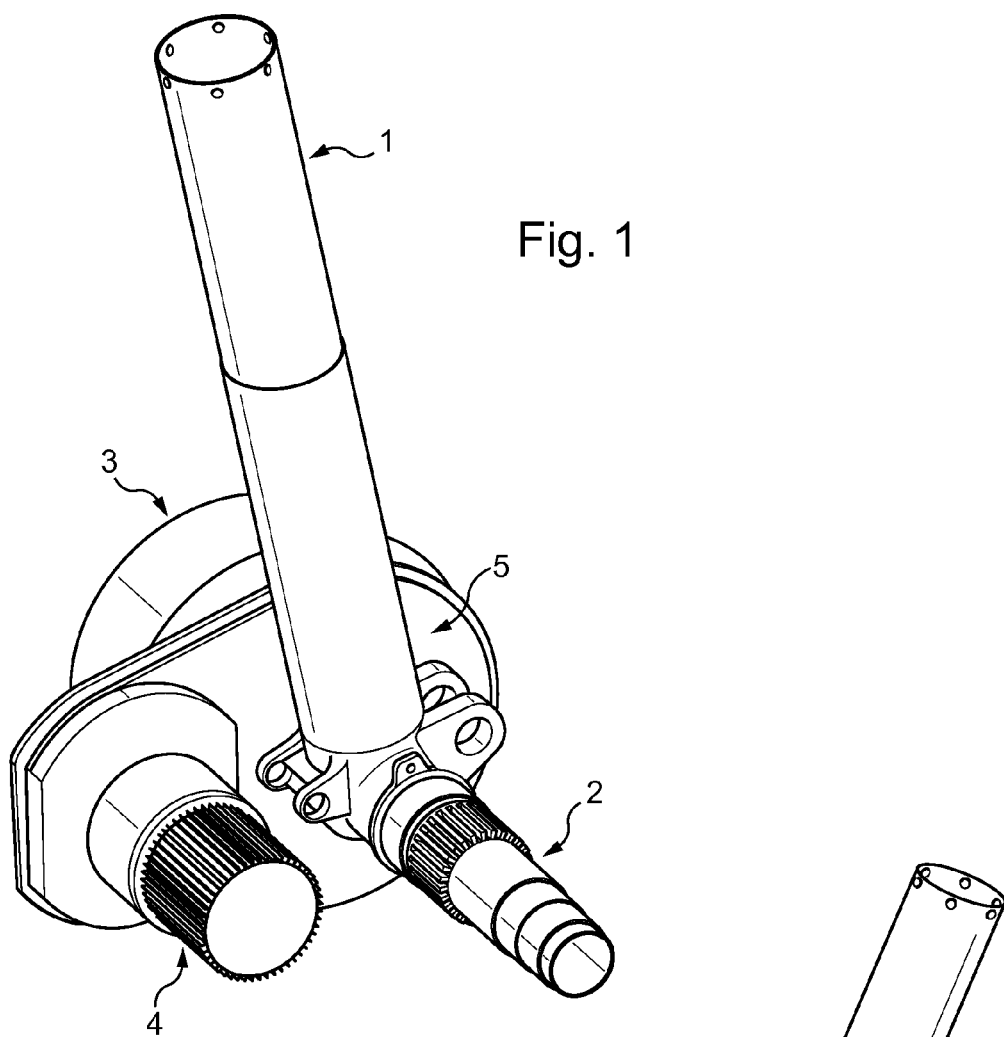
FIG. 1 is a partial view in perspective of a landing gear equipped with a wheel motorization arrangement.
Figure 2:
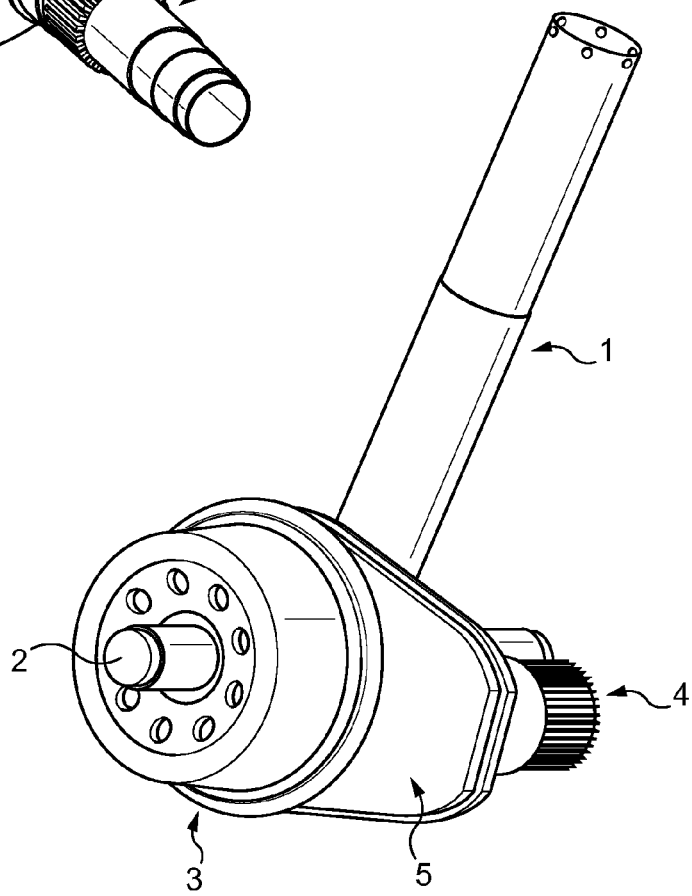
FIG. 2 is a perspective view similar to FIG. 1 showing the wheel rim in the foreground.

The following detailed description is merely exemplary in nature and is not intended to limit the present disclosure or the application and uses of the present disclosure. Furthermore, there is no intention to be bound by any theory presented in the preceding background or the following detailed description.

Referring to the drawings, a leg 1 of a landing gear (not shown in detail) of an aircraft (not shown) carries at its end an axle 2 on which is mounted a wheel rim 3 of which the tire is not shown.

A wheel motorization assembly comprising an electric motor 4 and a reducing device 5 is mounted on the axle 2. As a variant the motor 4 could be a hydraulic motor.

The reducing device 5 will not be described in detail. It may be of a conventional type well-known to the person skilled in the art. It may also be of the type with a pendular part as described in patent application EP-2 527 249. The reducing device 5 comprises an output gear wheel or toothed wheel 6 capable of being rotationally driven around the axle 2 when the motor 4 rotates.

The output wheel 6 is coupled to the rim 3 by means of a coupling device 7.

Figure 5:
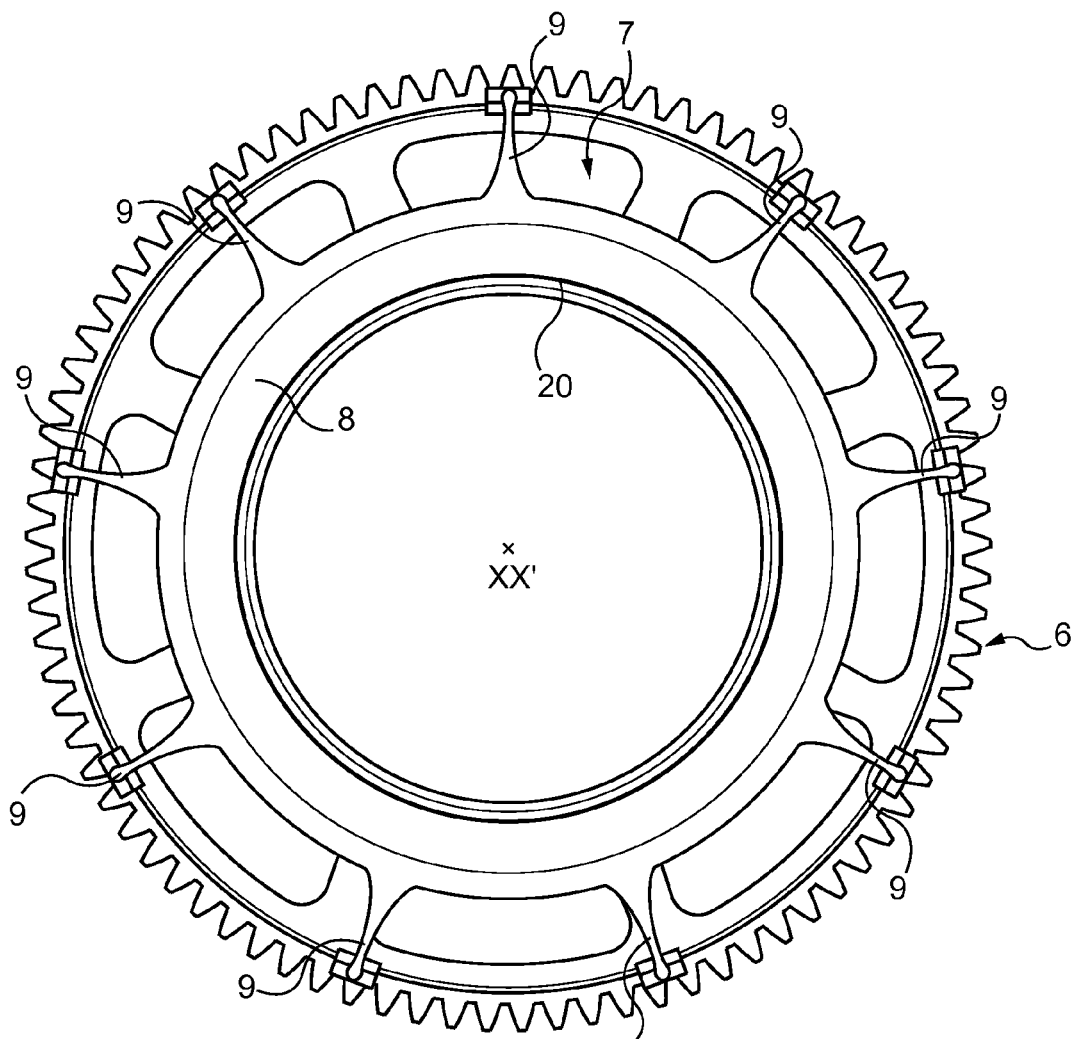
FIG. 5 is a plan view showing the coupling device of FIG. 4 and an output gearwheel of the motorization device.

The coupling device 7 is a part which is in one example, of metal and star-shaped in plan view. It also comprises a central part or hub 8 in the form of a disk or as a variant in the form of a dish, having at its center an opening of axis XX' for the passage in particular of the axle 2, and a certain number of arms 9 extending, as seen in plan view, in a radial direction relative to the axis of the central part 8. In the example illustrated by FIG. 5 the coupling device 7 comprises nine arms 9.

The central part 8 is fastened in the neighborhood of its inner perimeter 10 coaxially to the output gear wheel 6 by crimping, welding or any other appropriate means suitable in operation to provide the transmission of the motor torque between the gear wheel 6 and the coupling device 7.

The gear wheel 6 is rotatably mounted on the axle 2 by means of a bearing 11. The rim 3 is rotationally mounted on the axle 2 by means of bearings 12 and 13.

Figure 6:
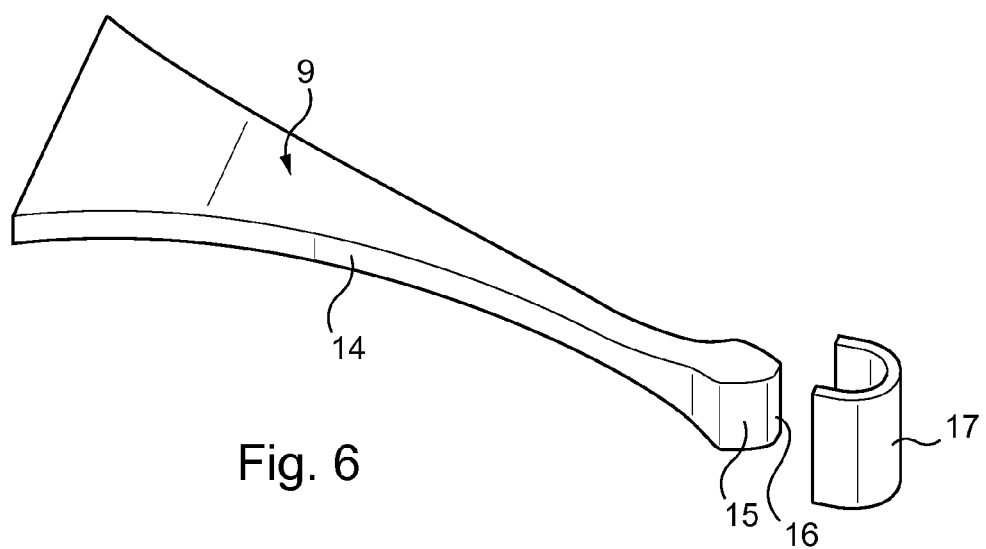
FIG. 6 is a partial view in perspective illustrating parts of the coupling device.

The arms 9 of the coupling device are strips integrally formed with the central part 8. As seen in plan view, the arms or strips 9 are wider at their base where they are connected to the central part 8 than at their end by which they are coupled to the rim 3. The narrowing of the arms 9 from their base to their end may be provided according to a curved lateral profile 14 as represented in FIG. 6. As a variant, the arms may be substantially trapezoidal in shape with rectilinear lateral flanks, or have any other appropriate shape. The thickness of the arms 9 is not necessarily uniform from one end to the other and may vary continuously or discontinuously.

The material and dimensioning in terms of width and thickness of the arms 9 are chosen to give them: at every point very high rigidity in a plane perpendicular to the axis XX' of the coupling part 7, in order to enable the transmission of the torque between the gear wheel 6 and the rim 3; and appropriate flexibility perpendicularly and in other directions transverse to a plane perpendicular to the axis XX' in order to enable the deformations of the axle 2 and of the wheel 3 to be absorbed during locomotion of the aircraft on the ground.

Figure 3:
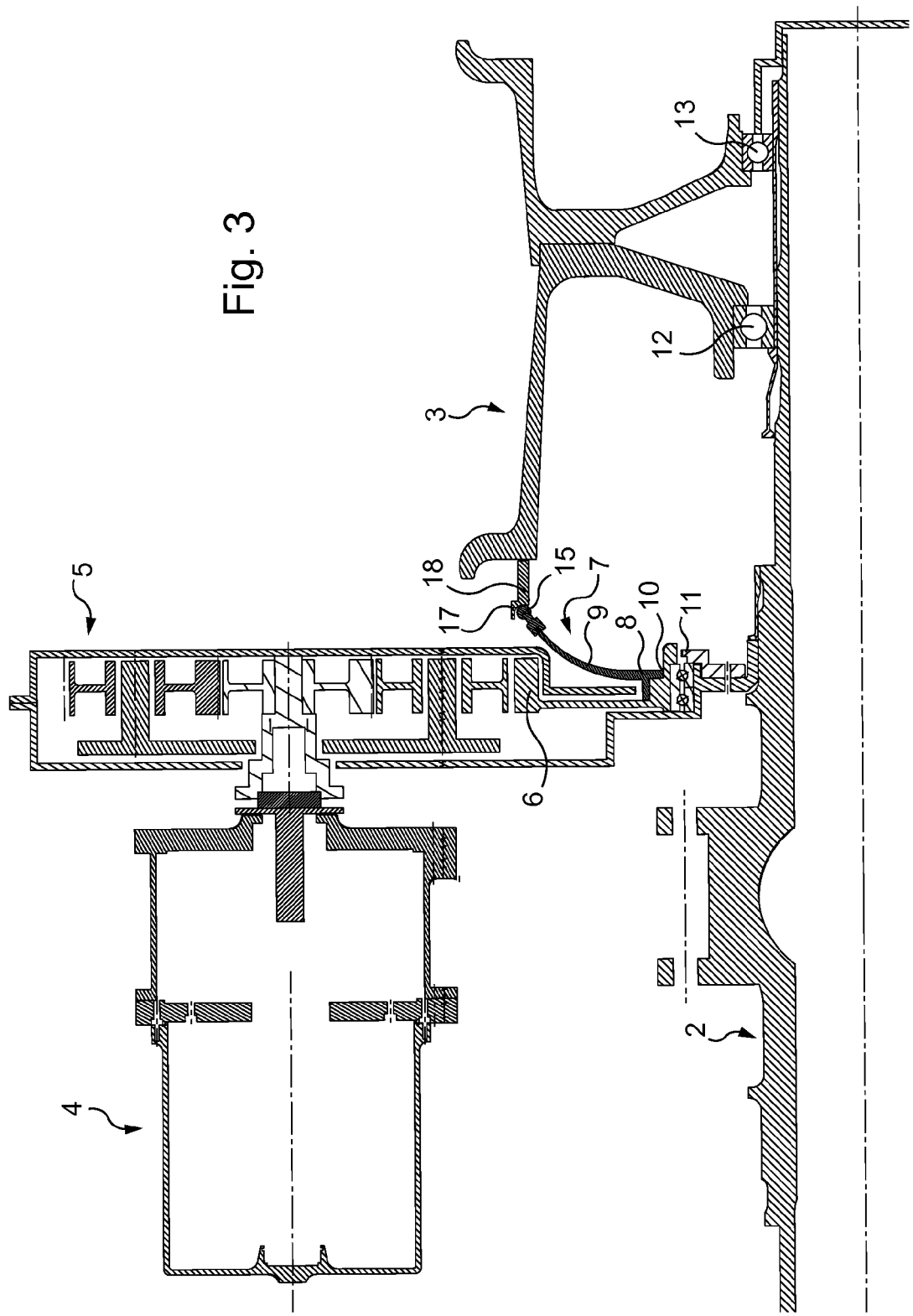
FIG. 3 is a partial view in cross-section of the members represented in FIGS. 1 and 2, in a plane containing the axis of the motor and the axis of the axle.
Figure 4:
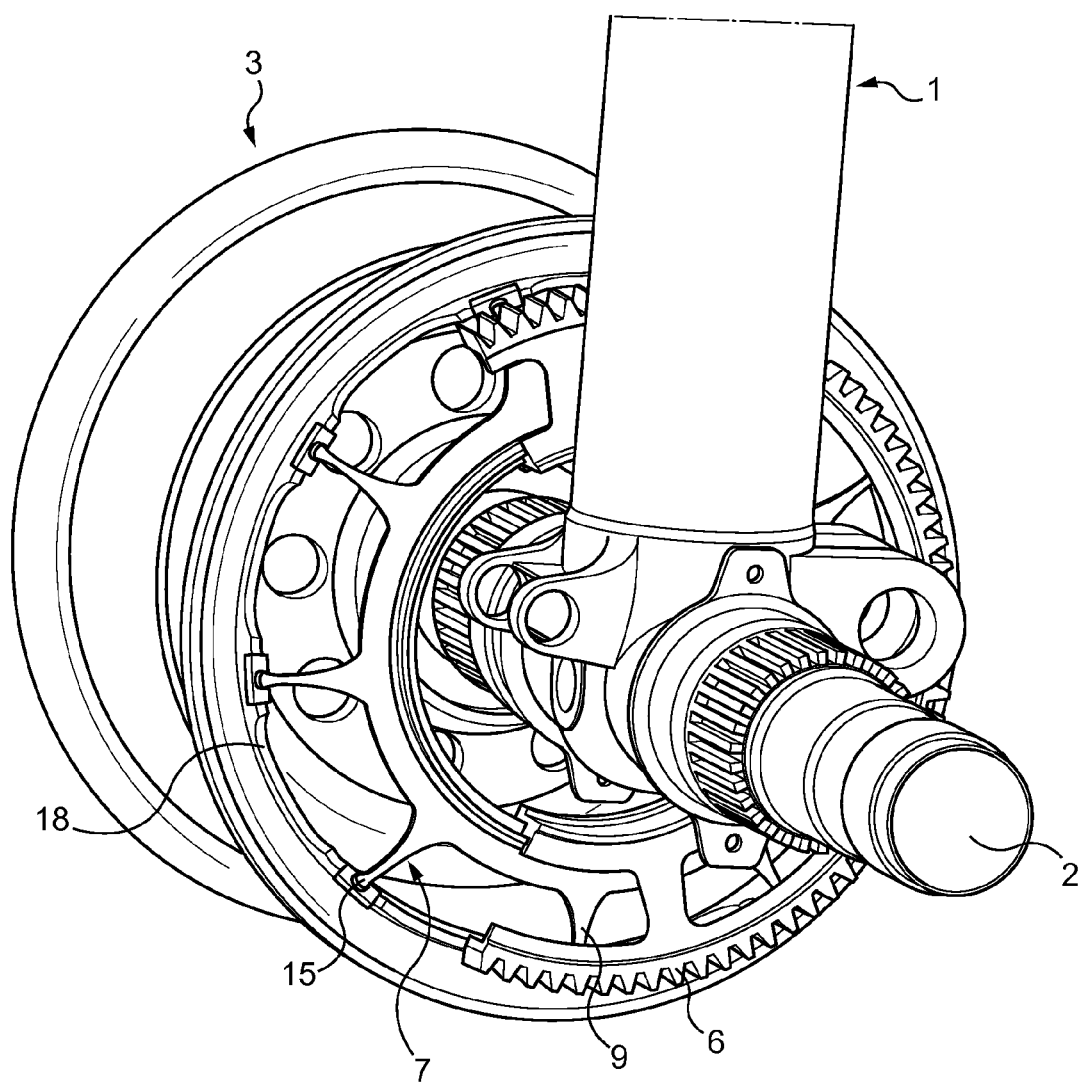
FIG. 4 is a perspective view with partial cutting away of the wheel rim and of the device for coupling between that rim and the motorization device.

As shown by FIG. 3, the arms 9 have, in a longitudinal plane containing the axis XX' and which passes by their end, a curved profile the concavity of which is turned towards the end of the axle 2 receiving the rim 3. This curvature is greater or lesser according to the bulkiness of the braking mechanism (not shown), in one example, according to the extent to which it extends outside the volume in which it is received between the hub 2 and the internal profile of the rim 3 which is open towards the output gear wheel 6.

In order to provide the link between the coupling device 7 and the rim 3, the arms 9 have at their end a tumescence forming a knob 15. In cross-section (in a plane perpendicular to the axis XX') this knob has a substantially trapezoidal profile or, as a variant, a bulbous profile. In one example, the length of the knob 15 (considered in cross-section in an axial plane containing the axis XX') is appreciably greater than the thickness of the arm 9. As a variant, the knob 15 may be hemispherical.

The profile of the arm 9 and that of the knob 15 are generally chosen such that the arris or the radially outer surface 16 of the knob 15 is substantially parallel to the axis XX'. To that end the arm comprises where appropriate a portion of inverse curvature in the neighborhood of its end carrying the knob 15.

The knobs 15 are adapted to be each received in a housing 17 of U-shaped section of which the opening is directed radially towards the axis of the rim 3, which coincides with the axis XX' of the coupling device 7 and of the axle 2 in their position as mounted on the latter. The housings 17 are oriented parallel to the axis of the rim 3 and they are open at their end that is turned towards the coupling device 7 when the rim 3 is mounted on the axle 2. On the other hand, the housings 17 are closed at their opposite end.

There are the same number of housings 17 as knobs 15. The housings 17 are parts subject to wear which are mounted onto an annular ring 18 fastened to the rim 3. The axial length of the ring 18 is chosen so as to limit the curvature of the arms 9 to an extent compatible with the constraints linked to the space occupied by the braking mechanism and by the reducing device 5. The diameter of the ring 18 is adapted such that the housings 17 are substantially aligned with the knobs 15 and adapted to receive them by a movement of translation of the rim 3 when the rim is mounted in the desired angular position on the axle 2.

In one example, the dimensions of the knobs 15 and of the housings 17 are chosen such that there is a certain play when the former are received in the latter. This play facilitates the mounting of the wheel and the proper working of the arms 9 when the axle 2 is subjected to deformations during locomotion on the ground of the aircraft.

On mounting a wheel on the axle 2, the coupling between the rim 3 and the gear wheel 6 is carried out very easily, without additional operation other than the angular positioning of the rim 3 to ensure the alignment of the housings 17 with the knobs 15. Once the rim 3 has been mounted on the axle 2 with the required degree of tightness, the knobs 15 are thus housed in the housings 17.

The geometrical and mechanical characteristics of the coupling device 7 are chosen such that in this mounted position of the wheel the arms 9 are placed in a pre-stressed state. This pre-stressing of the arms 9 is negligible relative to the force with which the wheel must be tightened. There is thus no need to modify the tables which define the mandatory tightening force to apply for each type of wheel and for each location of a wheel on a landing gear.

In operation, when the rim 3 is driven by the motor 4 via the reducing device 5 and the coupling device 7, the wheel adopts a certain camber angle which depends on the degree of deformation of the axle 2. This camber angle may be accentuated by the deformation of the wheel itself.

The pre-stressing and the elasticity of the arms 9 as well as the elongate shape of the knobs 15 and of the housings 17 make it possible to ensure that despite this camber angle the ends of some of the arms 9 do not escape out of the housings 17 and that the whole of the mechanical link between the output gear wheel 6 and the rim 3 is maintained uninterrupted.

The deformations which the arms 9 undergo in operation do not compromise the transmission of the torque between the gear wheel 6 and the rim 3. To be precise, in a diametric plane the arms 9 have very low deformability and therefore have a very high rigidity.

Given the dimensions of the various mechanical parts involved and their manufacturing tolerances, it would not be possible from a purely geometrical point of view, in the absence of any transmission of torque, for all the knobs 15 to be bearing inside their housing 17: a single one of the knobs 15 may bear in its housing 17. However, although the arms 9 have very great rigidity in a diametric plane, a mechanical system is never infinitely rigid and there are always micro-deformations under the effect of stresses. In operation, these micro-deformations of the arms make it possible to ensure that all the knobs 15 bear inside their respective housing and that all the arms 9 therefore participate in the transmission of the torque.

The link between the wheel and the coupling device 7 do not affect the conventional operations of demounting the wheel: after untightening, the wheel is withdrawn by translation on the axle 2, which gives rise to the exiting of the knobs 15 from the housings 17.

The housings 17 and the knobs 15 are removable parts that are subject to wear which may be replaced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An elastic device for coupling between an aircraft landing gear wheel and a coaxial motorization member for motorization of said wheel, the elastic device comprising:
a plurality of arms for rotationally coupled fastening to said motorization member adjacent a first radially inner end of the plurality of arms and the plurality of arms are configured to be linked to said wheel adjacent a radially outer opposite end of the plurality of arms,
said plurality of arms being substantially rigid in a plane perpendicular to the rotational axis of the wheel and flexible in directions substantially transverse to said plane.

2. The device according to claim 1, wherein said plurality of arms are joined to a hub adapted to be fastened to said rotary motorization member.

3. The device according to claim 1, wherein said plurality of arms are in the form of strips.

4. The device according to claim 3, wherein said strips are of smaller cross-section adjacent to the radially outer end than adjacent to the radially inner end.

5. An elastic device for coupling between an aircraft landing gear wheel and a coaxial motorization member for motorization of said wheel, the elastic device comprising:
a plurality of arms for rotationally coupled fastening to said motorization member adjacent a first radially inner end of the plurality of arms and the plurality of arms are configured to be linked to said wheel adjacent a radially outer opposite end of the plurality of arms,
said plurality of arms being substantially rigid in a plane perpendicular to the rotational axis of the wheel and flexible in directions substantially transverse to said plane;
wherein said plurality of arms are configured to be received, at the radially outer end, bearing in respective housings of a rim of said wheel.

6. The device according to claim 5, wherein said housings are substantially the shape of a channel of U-section open at one of its ends and in that said plurality of arms have at said radially outer end an elongate knob configured to be received in one of said housings.

7. The device according to claim 6, wherein the length of said housings is configured to ensure said knobs are retained independently of a camber angle of said wheel.

8. The device according to claim 6, wherein said housings and said knobs are removable parts that are subject to wear and are replaceable.

9. The device according to claim 5, wherein said plurality of arms are dimensioned such that, in the mounted position of said wheel on a landing gear, the plurality of arms are axially biased.

10. The device according to claim 5, wherein said housings are provided in a ring joined to said rim.

11. An aircraft landing gear, comprising:
at least one wheel; and
a device for motorization of said at least one wheel comprising a motorization member, and a coupling device, the coupling device including:
a plurality of arms for rotationally coupled fastening to said motorization member adjacent a first radially inner end of the plurality of arms and the plurality of arms are configured to be linked to the at least one wheel adjacent a radially outer opposite end of the plurality of arms, said plurality of arms being substantially rigid in a plane perpendicular to the rotational axis of the at least one wheel and flexible in directions substantially transverse to said plane.

12. The aircraft landing gear according to claim 11, wherein the at least one wheel is provided with housings that each receive the radially outer end of an arm of the coupling device.

13. The aircraft landing gear according to claim 12, wherein the at least one wheel comprises an annular ring carrying said housings.

14. An aircraft, comprising:
a landing gear including at least one wheel, a motorization member and a coupling device, the coupling device including:
a plurality of arms for rotationally coupled fastening to said motorization member adjacent a first radially inner end of the plurality of arms and the plurality of arms are configured to be linked to the at least one wheel adjacent a radially outer opposite end of the plurality of arms, said plurality of arms being substantially rigid in a plane perpendicular to the rotational axis of the at least one wheel and flexible in directions substantially transverse to said plane.

15. The aircraft according to claim 14, wherein said plurality of arms are joined to a hub adapted to be fastened to said motorization member.

16. The aircraft according to claim 14, wherein said plurality of arms are configured to be received, at the radially outer end, in respective housings of a rim of said at least one wheel.

17. The aircraft according to claim 16, wherein said housings are substantially the shape of a channel of U-section open at one of its ends and in that said plurality of arms have at said radially outer end an elongate knob configured to be received in one of said housings.

18. The aircraft according to claim 16, wherein said plurality of arms are dimensioned such that, in the mounted position of said at least one wheel on the landing gear, the plurality of arms are axially biased.

19. The aircraft according to claim 17, wherein the length of said housings is configured to ensure said knobs are retained independently of a camber angle of said at least one wheel.

\* \* \* \* \*